United States Patent [19]

Charransol et al.

[11] 3,886,318

[45] May 27, 1975

[54] PROCESS AND APPARATUS FOR SWITCHING PCM SIGNALS FROM A NORMAL TRANSMISSION PATH TO AN EMERGENCY PATH

[75] Inventors: Pierre Charransol; Jacques Hauri, both of Paris; Serge Robert Fontana, Elancourt, all of France

[73] Assignee: International Standard Electric Corporation, New York, N.Y.

[22] Filed: May 31, 1973

[21] Appl. No.: 365,430

[30] Foreign Application Priority Data

June 15, 1972 France .............................. 72.21534

[52] U.S. Cl. ........................ 179/15 BF; 340/147 SC

[51] Int. Cl. .............................................. H04j 3/14

[58] Field of Search ....... 325/2; 179/15 AD, 15 AT, 179/170 F, 15 BD, 15 BF; 333/2, 3, 15, 16; 340/147 SC

[56] References Cited

UNITED STATES PATENTS 2,680,162 1/1954 Brehm et al. .................. 179/15 BF

*Primary Examiner*—George H. Libman

*Attorney, Agent, or Firm*—James B. Raden; Delbert P. Warner

[57] ABSTRACT

A system is shown for switching PCM signals from a normal transmission path to an emergency transmission path when a normal path fails. Transmission is suspended during a period equal to at least the longest transmission time to prevent the transmission of incomplete data or check signals over the emergency path. After the time period elapses, transmission is maintained over the emergency path.

2 Claims, 6 Drawing Figures

PROCESS AND APPARATUS FOR SWITCHING PCM SIGNALS FROM A NORMAL TRANSMISSION PATH TO AN EMERGENCY PATH

BACKGROUND OF THE INVENTION

1. Field of the Invention

The present invention relates to a switching process and means for switching signals from a first, or normal, transmission path onto a second, or emergency transmission path in a PCM center. It may be used, in particular, in telephone exchanges employing time division switching of pulse code modulation signals.

2. Description of the Prior Art

At the inputs of an exemplary PCM exchange, the signals from the lines are sampled at 8 kHz and each sample is converted into an 8-bit coded combination. Each 8-bit combination is transmitted in parallel on 8 conductors during a very short time interval constituting a time channel. It is possible to time multiplex 256 channels, for example. In such an example, the recurring period of the successive time slots of a channel is 125 microseconds, whereas the duration of each time slot is approximately 500 nano-seconds. An incoming multiplex group routes the signals from 256 lines. A similar outgoing multiplex group routes the signals towards the same 256 lines. The abovementioned numerical values, without being necessary, are nevertheless currently admitted.

Inside the exchange, it is necessary that a coded signal combination appearing in a channel time slot of a multiplex group be retransmitted in any channel time slot of any multiplex group. This entails space switching operations (connections from group to group) and time switching operations (connections from channel to channel). They will be carried out by means of a network including space switches and stores. This network may be, for example, of the well-known space-time-space type. A connection path between an incoming channel of a first line and an outgoing channel of a second line uses two space switches arranged, in a way, on each side of a memory cell; they give it access respectively to the incoming multiplex groups and to the outgoing multiplex groups. In this way, at the time slot assigned to the incoming channel and through the first switch oriented onto the appropriate incoming group, a coded combination originated from the incoming channel is stored in the memory cell. At the time assigned to the outgoing channel and through the second switch oriented onto the appropriate outgoing group, the coded combination originated from the incoming channel and stored in the memory cell is retransmitted on the outgoing channel. The connection in the opposite direction between the outgoing channel of the first line and the incoming channel of the second line is carried out in the same way and uses generally the same memory cell.

In such an exchange, it is to be noted that the space switches are used, by time multiplexing, for a great number of calls. It is the same for the speech store common circuits and, in a general way, for all circuits transmitting and/or switching coded combinations. A failure in any of these circuits will thus affect all the calls using the faulty circuit.

The French Pat. application No. 71 07697, filed on Mar. 5, 1971 in the name of the CGCT entitled "Coded signal transmission and/or switching network" describes a transmission network which obviates the effects of such a drawback. A corresponding U.S. Pat. application No. 229,869 was filed on Feb. 28, 1972, in the United States. This application was replaced by a continuation application No. 387,048 on Aug. 9, 1973.

The network, according to the invention, is constituted by the juxtaposition of several independent network sections each provided for transmitting and/or switching one single bit of the coded combinations in order that any failure, wherever it occurs, affects only one bit of the coded combinations, which both facilitates the detection of any failure and makes it possible to correct or minimize the relevant effects.

Each switch is thus constituted by several independent elementary switches, each one switching one bit of the coded combinations; these elementary switches are obviously parallel-controlled in order to have always the same orientation. Similarly, each store is constituted by several elementary stores, each storing one signal, these elementary stores are parallel-controlled.

Moreover, for the transmission of eight bits in parallel, for example, where is provided in this network a ninth network section or emergency section. This section, in normal operation, may be used for the transmission of check bits. As soon as one of the eight network sections transmitting the coded combinations fails, it is replaced by the emergency section; the optional transmission of the check bits is then momentarily either assigned to the faulty section or relinquished, while it is proceeded to the replacement of the faulty element.

In such a network, the switching onto the emergency section is done as soon as a failure is detected. This switching takes place simultaneously at all the network inputs and outputs. Indeed, when a failure is detected, only the faulty network section is identified. The switching onto the emergency section is then carried out for all the exchange multiplex groups. At the inputs, the bit of the coded combinations which should be transmitted through the faulty section is switched onto the emergency section; at the outputs, the reverse switching is performed in order to give to the bit supplied by the emergency section the place it has in each coded combination. Now, due to the time nature of the switching, the coded combinations, arriving at the inputs of the network, take a variable time to reach the outputs. Consequently, it is impossible to avoid, at the outputs, a temporary confusion between the normal combinations entering the network before the switching, and those which have been subject to the switching, which results in the supply of erroneous combination supply. Such errors are noted not only for the faulty sections but also for all the undamaged exchange sections.

Such a disturbance in the transmission, which can be negligible in a telephone application, would undoubtedly hamper a data processing center and therefore cannot be accepted.

BRIEF DESCRIPTION OF THE INVENTION

The object of the present invention is thus, generally speaking, to provide a coded signal transmission and/or switching network, designed in order to avoid these drawbacks.

The switching process of a transmission path, or normal path, onto another transmission path, or emergency path, is characterized in that it includes the following steps from a switching request: (a) interruption of the signal transmission on the emergency path during a time at least equal to the longest transmission time through the center; (b) then, switching onto the emergency path at the inputs, and settling in parallel the respective outputs of the normal path and of the emergency path during a time at least equal to the longest transmission time through the center; (c) finally, switching at the outputs, the settling in parallel being removed.

The object of the present invention also relates to switching means including, in particular, a first switch inserted in the emergency path, at each network input, and provided for stopping the check signal transmission on this emergency path, as well as a set of connection switches provided at each network output, for the setting in parallel of the emergency path and of one of the normal paths selectively designated.

Finally, the invention provides a control device which is started by check means, upon detection of a failure, and which is provided for supplying an interrupt signal controlling said first switch, at each network input, and therefore stopping the check signal transmission on the emergency path, then a connection signal controlling one of said connection switches, at each network output, according to the faulty network section, thus setting in parallel the emergency path and the faulty normal path, an input switching signal supplied simultaneously with the beginning of the connection signal and controlling in a well-known way the switching at the inputs, an output switching signal, supplied simultaneously with the end of the connection signal and controlling in a well-known way the switching at the outputs.

The duration of the interrupt and connection signals is at least equal to the maximum transmission duration of a coded combination through the switching center and it is the same for the time interval between the input and output switching signals.

BRIEF DESCRIPTION OF THE DRAWINGS

Various other features will be disclosed from the following description given by way of a non-limited example referring to FIGS. 1 to 6 which represent.

DESCRIPTION OF PREFERRED EMBODIMENTS

First will be described, referring to FIG. 1, the block schematic of the circuits of a switching network in which may be applied the present invention.

This network includes incoming multiplex groups such as GE1.

An outgoing multiplex group such as GS1 corresponds to each of them. Each multiplex group includes, for example, 256 time channels. To each time channel corresponds a channel time slot of about 500 ns during which is transmitted a coded combination on several conductors in parallel. The recurring period of the channel time slot is 125 μs.

For the call establishment, several switching units are provided. For clarity reasons, only one of them has been represented in FIG. 1 which includes a path store MT1, a speech store MP1, an incoming group switch CE1 and an outgoing group switch CS1.

All units through which are transmitted the coded combination, that is the switches and the speech store, are made up of the juxtaposition of elementary elements each of them transmitting one of the bits of the coded combinations. Thus, switch CE1 is made up of nine elementary switches $CE1_0$ to $CE1_8$, identical and parallel-controlled. Each of them switches and transmits one bit, in a way totally independent of the others, so that a failure can only affect one bit at a time. Similarly, store MP1 is made up of nine elementary independent stores $MP1_0$ to $MP1_8$ which are parallel-controlled and switch CS1 includes nine elementary switches $CS1_0$ to $CS1_8$.

Figure 1:
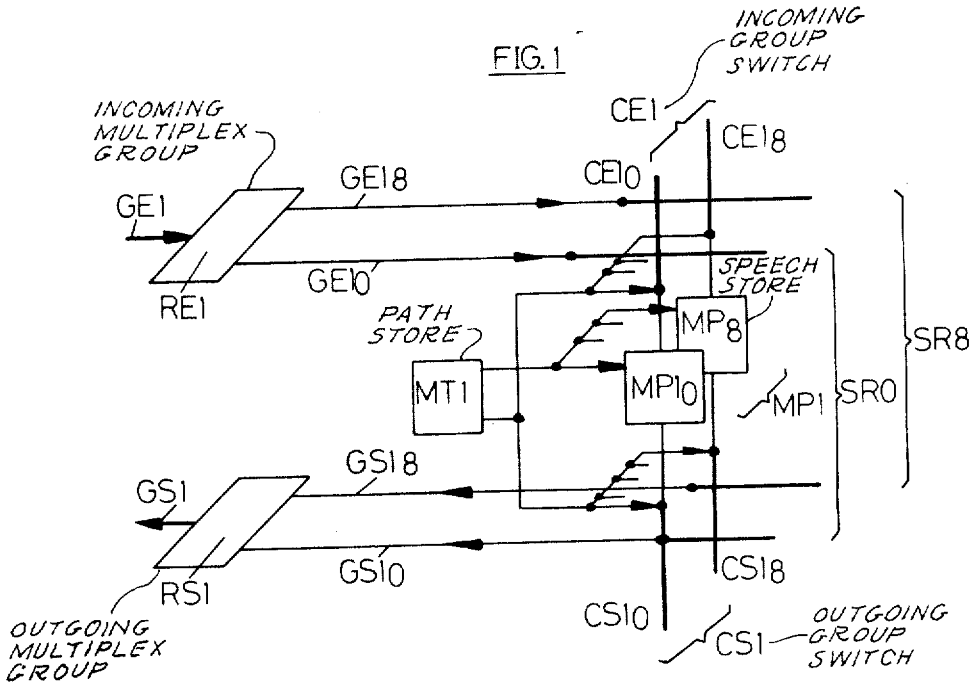
FIG. 1, the block schematic of a well-known time division switching network wherein may be applied the present invention.

In summary, it may be considered that the switching network of FIG. 1 is constituted by several network sections SR0 to SR8, one network section including all the elementary elements transmitting one bit of the coded combinations.

Path store MT1 is a memory having 256 cells cyclically read-out in synchronism with the multiplex group channel time slots. Each cell may contain an address of one cell of the speech store and a multiplex group number.

Speech store MP1 may have up to 128 memory cells which will be each assigned to one cell. These memory cells are addressed in response to the information supplied by the path store MT1.

Switch CE1, during each channel time slot, associates the input of store MP1 with any incoming group in response to the information supplied by one cell of path store MT1.

Switch CS1, during each channel time slot, associates the output of store MP1 with any outgoing group. It always orientates in the same position as switch CE1.

Figure 6:
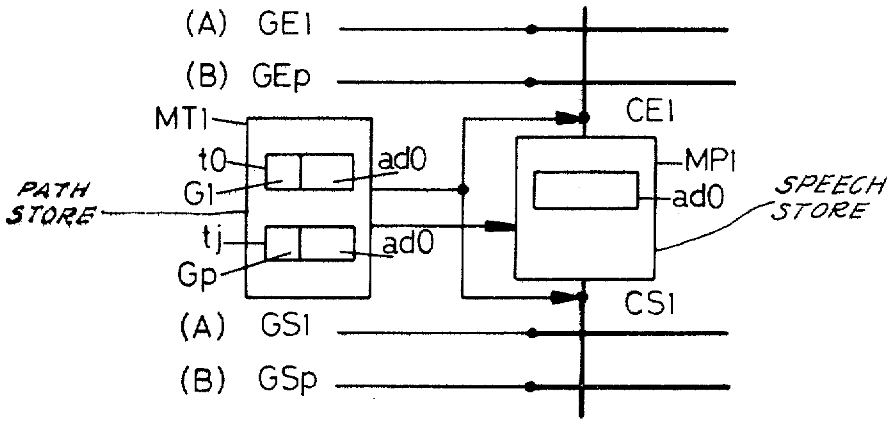
FIG. 6, an illustration of the contents of stores MT1 and MP1 of FIG. 1.

Now will be described the operation of this network referring to FIG. 6 and considering the case of a call between a subscriber (A) to which corresponds the channel time slot tO on the incoming and outgoing groups GE1 and GS1, and another subscriber (B) to which corresponds the channel time slot tj on the incoming and outgoing groups GEp and GSp.

At the channel time slot tO, a corresponding cell of path store MT1 supplies a group number G1 and an address adO. This number is sent to switches CE1 and CS1, in parallel. In response, the latter orientate respectively onto the incoming and outgoing groups GE1 and GS1. Simultaneously, the address ad0 is transmitted to the speech store MP1. In this store, the memory cell corresponding to this address is successively the object of a reading and writing operation.

The information read-out at the address ad0 is transmitted to the miltiplex group GS1 via switch CS1. Then, the information present on the multiplex group GE1, transmitted via switch CE1 to the input of speech store MP1, is recorded in lieu of that just read-out, at the address ad0. Subscriber (A) has thus received a coded sample, whereas the one it supplied has just been recorded.

At the channel time slot tj a corresponding cell of path store MT1 supplies the group number Gp and again address ad0. Switches CS1 and CE1 are accordingly oriented onto groups GEp and GSp. The address ad0 is transmitted to the speech store MP1.

The information read-out at address ad0 is transmitted on the outgoing multiplex group GSp via switch CS1. Then, the information present on the incoming multiplex group GEp, transmitted via switch CE1 to store MP1, is recorded at the address ad0. Subscriber (B) thus receives the coded sample previously transmitted by subscriber (A) and recorded at time t0. The coded sample it supplies has just been recorded at address ad0 and is kept until the next time slot t0 when it is transmitted to subscriber (A).

In FIG. 1, are also represented equipments RE1 and RS1 associated with groups GE1 and GS1. Equipment RE1 distributes the different bits of the coded samples from group GE1, over conductors $GE1_0$ to $GE1_8$. Equipment RS1 receives the different bits of the coded combinations appearing on conductors $GS1_0$ to $GS1_8$ and reconstructs coded combinations, supplied on group GS1, as they would be if equipments RE1 and RS1 did not exist.

As an illustration, if the coded combinations transmitted on the incoming and outgoing groups have eight bits whereas the switching network includes nine sections SR0 to SR8, equipment RE1 will route the eight bits of the incoming combinations onto sections SR0 and SR7 ; equipment RS1 will reconstruct the outgoing combinations owing to the bits supplied by these same sections SR0 to SR7. It will be the same for all multiplex groups and section SR8 will be used as emergency section. Non-represented control means will be provided acting as soon as a failure happens in one of sections SR0 to SR7, on equipments RE1 and RS1 as well as on all identical equipments associated with the other multiplex groups, in order that these equipments route onto section SR8 the bit of the coded combinations normally transmitted by the faulty section. These equipments thus enable, whichever is the faulty network section, the routing of the corresponding bit of the coded combinations onto the emergency section SR8 while the faulty section is in a way isolated.

The routing thus performed further to a failure, at the inputs and outputs of the switching network is called switching to emergency or more simply switching.

Since the incoming and outgoing multiplex groups supply eight bits per coded combination, the 9th network section SR8 is available in the absence of failure. Equipment RE1 may advantageously add to the 8 bits of the coded combinations of multiplex group GE1 a parity bit transmitted on section SR8, whereas equipment RS1 may include parity check means. In case of failure, the eight undamaged sections are used for transmitting the 8 data bits, as above-mentioned, whereas the parity check will be disconnected during the time necessary to the fault location.

In this network, in case of failure, the switching may take place simultaneously at the inputs and at the outputs. Now due to the time characteristic of the switching, a variable time is necessary to the different combinations entering the network for reaching the outputs. Thus, immediatly after the switching, at the outputs of the network, on the emergency section, will be received check bits entering the network before the switching as well as data bits entering the network after the switching. Both cases cannot be distinguished. This confusion is then noted not only for the faulty sections but also for all the undamaged sections of the switching center. This cannot be accepted and the invention provides means for avoiding it.

Now will be described, referring to FIGS. 2, 3 and 4, a process and means for switching onto the emergency section without disturbing the undamaged switching center sections.

Conventionnally the "AND" gates have been represented by a dot surrounded by a circle (symbol of logic intersection) the "OR" gates by a cross surrounded by a circle (symbol of logic union) and the bistables by two juxtaposed rectangles containing respectively digits 1 and 0 ; generally the bistable inputs have not been represented ; the bistable outputs are located at the upper part of the rectangles.

There has been chosen the case when the multiplex group GE1 supplies 8 bit coded combinations. Consequently, there has been provided, in equipment RE1 of FIG. 2, a parity generator PE1 delivering, on its outputs se0 to se7 the 8 bits of the incoming coded combinations, as well as, on its output se8, a parity bit calculated from the preceding ones.

Equipment RE1 besides includes a set of nine gates pe0 to pe8 enabling the transmission of the 9 bits from PE1 on conductors $GE1_0$ to $GE1_8$, as well as a set of transfer gates pf0 to pf7 enabling the transmission of any of the 8 bits of rank 0 to 7 on conductor $GE1_8$. The "OR" gate pp8 OR's the outputs of gates pf0 to pf7 with that of gate pe8 in order to control wire $GE1_8$.

Figure 2:
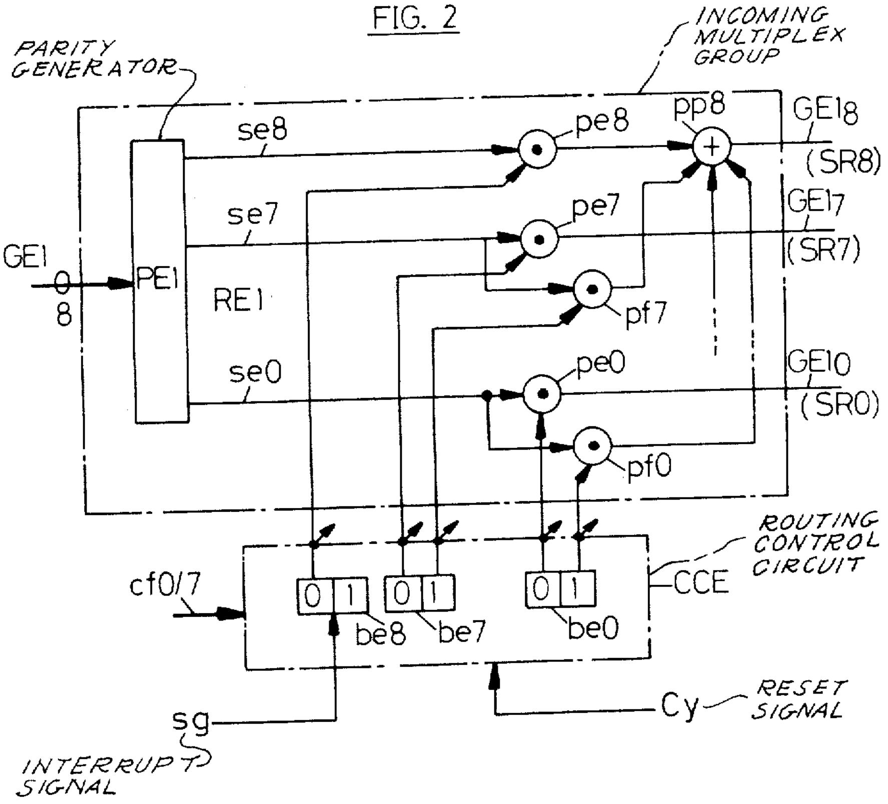
FIG. 2, an embodiment of an input equipment such as equipment RE1 of FIG. 1, according to the present invention.

In FIG. 2, a routing control circuit CCE has also been represented. It is common to all multiplex groups and is controlled by a signal combination sent on conductors cf0/7. It includes, in particular, nine bistables be0 to be8, the latter being separately controlled by conductor sg. The routing control circuit CCE receives also a reset signal on conductor cy.

Figure 3:
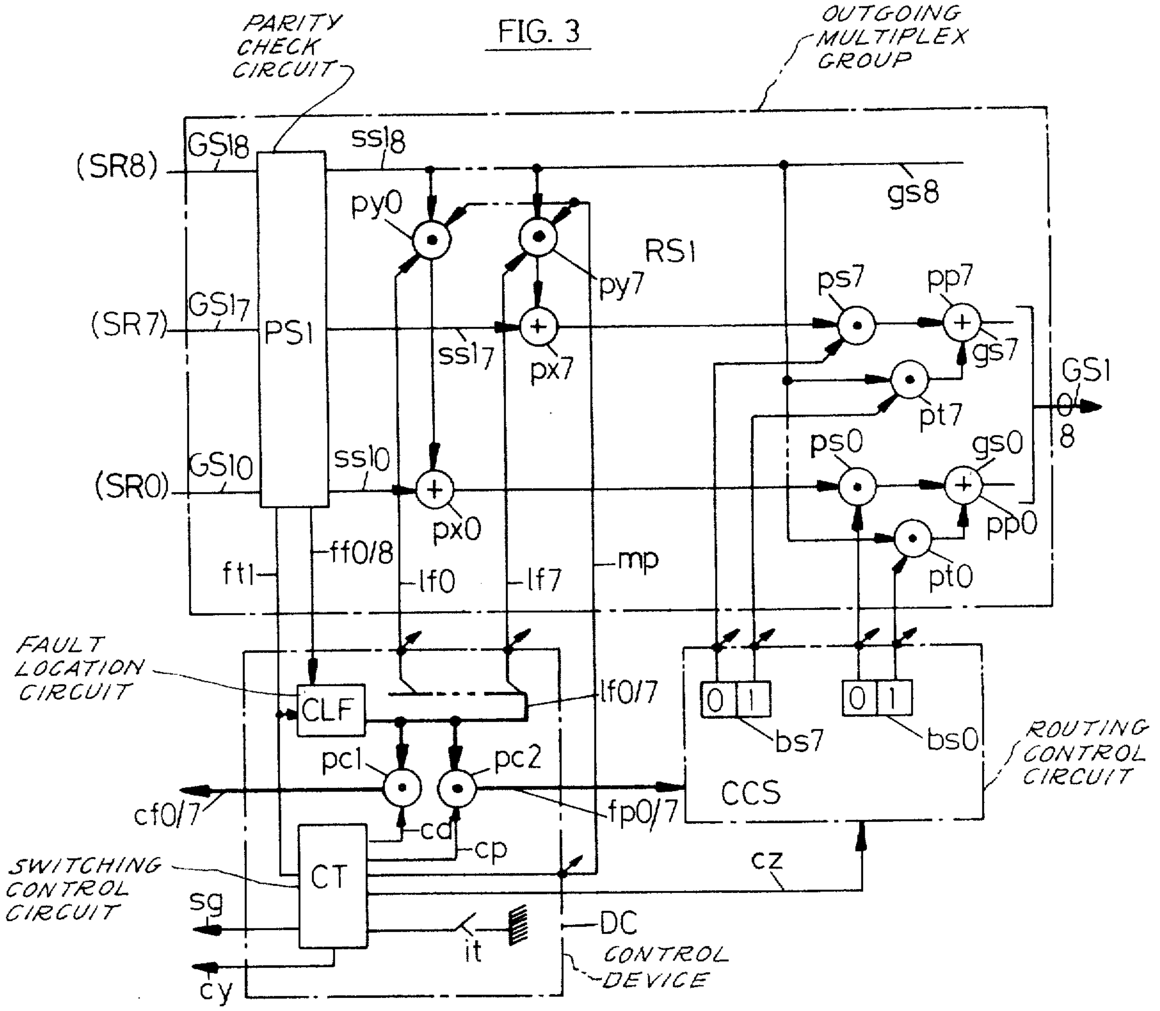
FIG. 3, an embodiment of an output equipment such as equipment RS1 of FIG. 1, according to the present invention.

Equipment RS1 of FIG. 3 includes a parity check circuit PS1 corresponding to circuit PE1. Circuit PS1 receives the coded combination bits on its input conductors $GS1_0$ to $GS1_8$. It supplies on its output conductors $ss1_0$ to $ss1_8$, bits identical to those previously received. In case of parity error, this circuit delivers a fault signal ft1.

Equipment RS1 includes moreover gates ps0 to ps7 for the direct transfer of the 8 bits of the coded combinations, in the absence of fault, as well as transfer gates pt0 to pt7 for the routing of the bit received by the parity check circuit PS1 on its input conductor $GS1_8$ towards any output conductor gs0 to gs7 of the multiplex group GS1.

Finally equipment RS1 includes gates py0 to py7 and gates px0 to px7 associated with the output conductors $ss1_0$ to $ss1_8$ of the parity check circuit PS1 whose function will be subsequently described.

In FIG. 3, a routing control circuit CCS common to all multiplex groups as well as a control device DC have been represented.

The routing control circuit CCS includes, in particular, eight bistables bs0 to bs7. It is controlled by a signal combination transmitted on conductors fp0/7 ; it also receives a reset signal on conductor cz.

The control circuit DC includes a switching control circuit CT and a fault location circuit CLF. Indeed, the addition of a parity bit enables error detection, but not the location of the fault among the coded combination bits arriving on conductors $GS1_0$ to $GS1_8$. However, it is possible to locate the fault by examining in cirucit CLF a certain number of erroneous combinations and by performing an integration, for example, since the error always concerns one same bit. Circuit CLF identifies the fault by marking one of conductors lf0/7.

The switching control circuit CT is started by fault signa transmitted on conductor ft1. In response, it performs an operating cycle during which it delivers different control signals to equipment RS1 as well as to the routing control circuits CCE and CCS. These signals are represented in FIG. 4.

In the absence of failure, all bistables be0 to be8 of the routing control circuit CCE and all bistables bs0 to bs7 of the routing control circuit CCS are reset. They enable respectively gates pe0 to pe8 and ps0 to ps7. The outputs se0 to se7 of the parity generator PE1 are respectively connected to conductors $GE1_0$ to $GE1_7$ via gates pe0 to pe7, the output se8 of circuit PE1 is connected to conductor $GE1_8$ via gates pe8 and pp8. In other respects, the outputs $ss1_0$ to $ss1_7$ of the parity check circuit PS1 are respectively connected to conductors gs0 to gs7 via gates ps0 to ps7 and pp0 to pp7 the output $ss1_8$ being directly connected to conductor gs8. In the switching network of FIG. 1, network sections SR0 to SR7 route the 8 data bits of all coded combinations, whereas the emergency section SR8 is reserved to the transmission of parity bits.

It will now be assumed that a failure has occurred in one of the network sections, SR0 for example. Due to this failure, an erroneous combination reaches the parity check device PS1 via conductors $GS1_0$ to $GS1_8$. The error is detected and device PS1 supplies an error signal on conductor ft1, whereas it supplies the erroneous combination on conductors ff0/8. It is the same for each erroneous combination reaching any output of the network of FIG. 1.

Circuit CLF thus receives erroneous combinations, accompanied by an error signal. It analyses them and, in a short time, marks one of conductors lf0/7 in order to designate the faulty section, in this case, conductor lf0.

Figure 4:
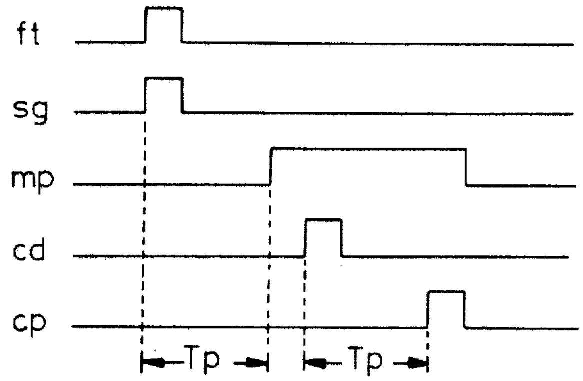
FIGS. 4 and 5, waveshapes illustrating the operation of the elements of FIGS. 2 and 3.

As soon as it receives an error signal such as ft1, the switching control circuit CT starts an operating cycle during which it supplies different signals illustrated by the waveshapes of FIG. 4. In ft has been represented an error signal. Circuit CT immediately supplies an interrupt signal sg towards the routing control circuit CCE of FIG. 2.

This signal sg triggers bistable be8 of circuit CCE. Consequently, in all input equipments and in particular in equipment RE1, the direct gate pe8 is non-conducting ; the parity bit transmission on conductor $GE1_8$ is stopped. The inputs of the emergency section SR8 (FIG. 1) are thus isolated.

After a time interval Tp at least equal to the largest propagation time through the network, it is certain that the last parity bit transmitted on conductor $GE1_8$ has reached the network output. It can thus be proceeded to the connection of the conductors corresponding respectively to the emergency section SR8 and to the faulty section SR0, that is in equipment RS1, to the connection of conductors $ss1_8$ and $ss1_0$. For this purpose, the control circuit CT supplies a signal mp enabling gates py0 to py7 in equipment RS1. Gate py0 which also receives signal lf0, is rendered conducting and the data bits supplied on conductor $ss1_8$ are transmitted to one input of the OR gate px0. The emergency section and the faulty section are thus set in parallel in each output equipment. As the parity bits have been removed, conductor $GS1_8$ is now permanently at level 0 and this parallel setting does not disturb the data bits appearing on conductor $GS1_0$.

Now can be done the switching in the input equipments, that is the routing of the data bits, previously transmitted to section SR0, towards emergency section SR8. To this end, the control circuit CT supplies one pulse cd to AND gates jointly represented by a gate pc1. This gate becomes conducting and marks one of conductors cf0/7, cf0 according to the chosen example. In response, bistable be0 of the routing control circuit CCE (FIG. 2) is set. In equipment RE1, this results in the blocking of gate pe0 and in the conduction of gate pf0. The coded combination bits supplied by the parity generator PE1 on its output conductor se0 are routed onto conductor $GE1_8$, in direction of section SR8 via AND gate pf0 and OR gate pp8. Conductor $GE1_0$ and all the inputs of section SR0 are thus isolated. In equipment RS1 appear the last data bits transmitted by section SR0 on conductor $GS1_0$ and the first data bits transmitted by the emergency section SR8 on conductor $GS1_8$. These bits are respectively found on the outputs $ss1_0$ and $ss1_8$ of the parity check circuit PS1. The setting in parallel of these conductors being achieved, the data bits are transmitted on conductor gs0 of the outgoing multiplex group GS1 via the AND gate ps0 and an OR gate pp0.

After the time interval Tp at least equal to the largest propagation time through the network, it is certain that the last data bit transmitted on conductor $GE1_0$ has reached the network output. Section SR0 can thus be completely isolated, by achieving the switching at the network outputs. To this end, the control circuit CT delivers a pulse cp to AND gates jointly represented by a gate pc2. This gate becomes conducting and marks one of conductors fp0/7, fp0 according to the chosen example. In response, in the routing control circuit CCS (FIG. 3), bistable bs0 is set, which blocks gate ps0 and enables gate pt0. In this way, the data bits transmitted on the output conductor $ss1_8$ of the parity check circuit PS1 are retransmitted on conductor gs0 via AND gate pt0 and OR gate pp0 ; the same data bits still transmitted by gates py0 and px0 are blocked by the AND gate ps0. The setting to parallel of both conductors $ss1_8$ and $ss1_0$ is therefore no longer necessary and can be removed. To this end, signal mp disappears thus blocking gate py0.

Now, at the input of equipment RS1, the data bits no longer appear on conductor $GS1_0$. In the switching network of FIG. 1, the network sections SR1 to SR8 route the 8 data bits of all coded combinations whereas section SR0 is isolated and that the parity bits are no longer transmitted. Without any drawback, it can be proceeded to the replacement of the faulty element of section SR0, since it does not route any information.

The return to normal operation can be caused by the sending of a starting pulse of the switching control circuit CT, for example by the momentary automatic or manual closure of a contact it.

Figure 5:
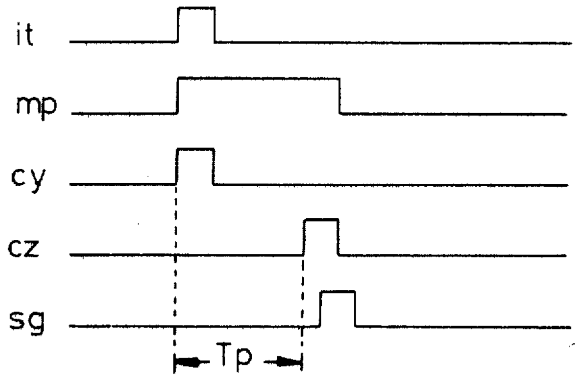

It may be now considered that the emergency section is the section of rank 0 and the faulty section, the section of rank 8. Now will be described referring to the waveshapes of FIG. 5, the different operations carried out for the return to normal operation.

Further to the non-conducting state of gate pe0, conductor $GE1_0$ remains isolated and the parity check circuit PS1 continues to detect errors. Conductor lf0 is marked by the fault location circuit CLF.

First will be proceeded to the setting in parallel of output conductors $ss1_8$ and $ss1_0$ of the parity check circuit PS1.

To this end, the switching control circuit CT, started by a pulse it, supplies a signal mp to gates py0 to py7. Gate py0, whose input conductor lf0 is marked, becomes conducting. The data bits supplied on conductor $ss1_8$ are also transmitted to conductor $ss1_0$. There has thus been achieved the setting in parallel of the emergency section SR8 and of the previously faulty section SR0. Simultaneously, the switching control circuit CT supplies via conductor cy a pulse to the routing control circuit CCE. This pulse resets the bistables other than be8 which are in position 1, that is bistable be0.

After a time interval Tp at least equal to the longest transmission time through the network, it is certain that the last data bit transmitted on conductor $GE1_8$ has reached the network output as well as the first data bit transmitted on conductor $GE1_0$. The routing of the data bits transmitted on conductor gs8 onto conductor gs0 can then be removed.

To this end, the switching control circuit CT supplies on conductor cz, a pulse to the routing control circuit CCS. This pulse resets all the bistables which are in position 1, that is bs0. The data bits are now transmitted on conductors se0 to se7, $GE1_0$ to $GE1_7$, $GS1_0$ to $GS1_7$, $ss1_0$ to $ss1_7$ and gs0 to gs7. The setting in parallel of conductors $ss1_8$ and $ss1_0$ can then be cancelled. To this end, the switching control circuit CT stops sending signal mp thus blocking gate py0.

Equipment RS1 has thus returned to its initial position.

The emergency section SR8 can thus be used anew for the transmission of the parity bits present on the output conductor se8 of circuit PE1 and blocked by gate pe8. The switching control circuit CT supplies, on conductor sg, a pulse which resets bistable be8 of circuit CCE. Gate pe8 becomes conducting and the input equipment RE1 has returned to its initial position.

Simultaneously, a non-represented delay circuit is initiated. This circuit blocks the switching control circuit CT in order that the latter does not begin a new switching cycle before the stabilization of the present signals and, in particular, before the parity bits reach circuit PS1.

After a time interval determined by the delay circuit, the whole system is ready, in case of any network section failure, to resume a switching cycle identical to that above-described.

It is obvious that the preceding description has only been given as an unrestrictive example and that numerous alternatives may be considered without departing from the scope of the invention. In particular, all numerical details have been given only to facilitate the understanding of the invention and may vary with each application.

We claim:

1. A process for switching a signal from transmission over a normal transmission path onto an emergency transmission path parallel to the normal path between the inputs and the outputs of a switching center following receipt of a switching request, comprising the steps of interrupting signal transmission on the emergency path for a time period at least equal to the longest time required for transmission of a signal through a switching center, switching the signal onto the emergency path at the inputs, and connecting the respective outputs of the normal path and of the emergency path to place the normal path and the emergency path in parallel for a time at least equal to the longest time required for transmission of a signal through the center, and operating switching means at the outputs to remove the parallel setting and provide the input signal to the output of the normal transmission path.

2. A switching device for switching signals from a normal transmission path onto an emergency transmission path parallel to the normal path between the inputs and outputs of a switching center, comprising an emergency path in parallel with normal transmission paths between switching center inputs and switching center outputs, a first switch inserted in the emergency path near the switching center inputs to stop transmission of signals on this emergency path, and sets of connection switches provided respectively at the switching center inputs and at the switching center outputs for establishing connections over lines between the selected normal transmission path and the emergency path, a control device which is started by an error signal from check means including a parity check circuit upon detection of a failure in one of said normal transmission paths, said control device supplying an interrupt signal which is used to control said first switch by breaking electrical continuity through the switch and thereby stopping the transmission of signals on the emergency path, said control device providing a connection signal controlling one of said connection switches near the switching center inputs and one of the connection switches near the switching center outputs according to the faulty network section, thus setting in parallel the emergency path and the faulty normal path, said control device providing an input switching signal simultaneously with the beginning of the connection signal and controlling switching at the inputs, said control device providing an output switching signal simultaneously with the end of the connection signal and controlling switching at the outputs, the duration of the interrupt and connection signals being at least equal to the maximum transmission duration of a coded combination through the switching center, the time interval between the input and output switching signals being also at least equal to this maximum transmission duration.

* * * * *